United States Patent
Wang et al.

(10) Patent No.: US 11,241,657 B2
(45) Date of Patent: Feb. 8, 2022

(54) FILTER FOR REMOVING SILICA FROM ULTRA PURE WATER AND METHOD OF USE

(71) Applicant: Pall Corporation, Port Washington, NY (US)

(72) Inventors: I-Fan Wang, Pensacola, FL (US); Amarnauth Singh, Selden, NY (US)

(73) Assignee: Pall Corporation, Port Washington, NY (US)

( * ) Notice: Subject to any disclaimer, the term of this patent is extended or adjusted under 35 U.S.C. 154(b) by 0 days.

(21) Appl. No.: 16/692,046

(22) Filed: Nov. 22, 2019

(65) Prior Publication Data

US 2021/0154621 A1 May 27, 2021

(51) Int. Cl.
*B01D 63/14* (2006.01)
*B01D 61/14* (2006.01)
(Continued)

(52) U.S. Cl.
CPC .......... *B01D 63/14* (2013.01); *B01D 61/147* (2013.01); *B01D 63/02* (2013.01); *B01D 63/067* (2013.01);
(Continued)

(58) Field of Classification Search
None
See application file for complete search history.

(56) References Cited

U.S. PATENT DOCUMENTS

| 5,543,047 A | 8/1996 | Stoyell et al. |
| 6,045,899 A | 4/2000 | Wang et al. |

(Continued)

FOREIGN PATENT DOCUMENTS

| JP | 2000-515062 A | 11/2000 |
| JP | 2001-509431 A | 7/2001 |

(Continued)

OTHER PUBLICATIONS

European Patent Office, Extended Search Report in counterpart European Patent Application EP20206507.4, dated Apr. 19, 2021.
(Continued)

*Primary Examiner* — David C Mellon
(74) *Attorney, Agent, or Firm* — Leydig Voit & Mayer, Ltd.

(57) ABSTRACT

A method for removing silica from ultra pure water (UPW) comprises passing UPW through a filter comprising a microporous cationically charged membrane having an upstream surface and a downstream surface; and a porous asymmetric membrane having a first surface and an upstream portion and a downstream portion and a second surface, and a bulk between the first surface and the second surface including the upstream portion and the downstream portion, the porous asymmetric membrane having decreasing pore sizes in a direction from the first surface and the upstream portion to the downstream portion and the second surface, the second surface comprising a skin having a nanoporous average pore size, wherein the first surface of the porous asymmetric membrane contacts the downstream surface of the microporous cationically charged membrane; the method including passing the UPW through the microporous cationically charged membrane before passing the UPW through the porous asymmetric membrane.

9 Claims, 3 Drawing Sheets

(51) Int. Cl.
  *B01D 63/02* (2006.01)
  *B01D 63/06* (2006.01)
  *B01D 69/02* (2006.01)
  *B01D 71/68* (2006.01)
  *C02F 1/42* (2006.01)
  *C02F 1/44* (2006.01)
  *C02F 101/10* (2006.01)
  *C02F 103/04* (2006.01)

(52) U.S. Cl.
  CPC ............ *B01D 69/02* (2013.01); *B01D 71/68* (2013.01); *C02F 1/42* (2013.01); *C02F 1/444* (2013.01); *B01D 2313/44* (2013.01); *B01D 2319/02* (2013.01); *B01D 2319/06* (2013.01); *B01D 2325/022* (2013.01); *B01D 2325/16* (2013.01); *C02F 2001/425* (2013.01); *C02F 2101/10* (2013.01); *C02F 2103/04* (2013.01)

(56) References Cited

U.S. PATENT DOCUMENTS

| | | | |
|---|---|---|---|
| 6,110,369 A | 8/2000 | Ditter et al. |
| 6,440,306 B1 | 8/2002 | Ditter et al. |
| 6,565,748 B1 | 5/2003 | Wang et al. |
| 6,565,782 B1 | 5/2003 | Wang et al. |
| 6,939,468 B2 | 9/2005 | Wang et al. |
| 7,045,064 B2 | 5/2006 | Warner |
| 7,125,493 B2 | 10/2006 | Wang et al. |
| 2009/0159526 A1 | 6/2009 | Okada et al. |
| 2015/0190760 A1 | 7/2015 | Singh et al. |
| 2016/0023171 A1 | 1/2016 | Phillip et al. |

FOREIGN PATENT DOCUMENTS

| | | | |
|---|---|---|---|
| JP | 2008-272753 A | 11/2008 |
| JP | 2011-62595 A | 3/2011 |
| JP | 2015-128761 A | 7/2015 |
| JP | 2016-514049 A | 5/2016 |
| WO | 98/01208 A1 | 1/1998 |
| WO | 99/02248 A1 | 1/1999 |
| WO | 2014/164793 A2 | 10/2014 |

OTHER PUBLICATIONS

Singapore Intellectual Property Office, Search Report in counterpart Singapore Patent Application No. 10202011496Q, dated Jul. 7, 2021.

Japan Patent Office, Office Action in counterpart Japanese Patent Application No. 2020-185089, dated Nov. 2, 2021.

FILTER FOR REMOVING SILICA FROM ULTRA PURE WATER AND METHOD OF USE

BACKGROUND OF THE INVENTION

During the manufacture of many semiconductors, chemicals used in the manufacturing stages must be rinsed from the semiconductor wafer surface with ultra pure water (UPW). However, impurities, particularly silica in various forms (dissolved, colloidal, and particulate) present in the wash water can remain on the wafer surface after the water has evaporated, causing defects in the resulting semiconductor device. Commercially available media for removing silica from UPW exhibit low flow rates and/or undesirable retention levels of colloidal silica and/or particulate silica.

The present invention provides for ameliorating at least some of the disadvantages of the prior art. These and other advantages of the present invention will be apparent from the description as set forth below.

BRIEF SUMMARY OF THE INVENTION

An embodiment of the invention provides a filter for removing undesirable material from ultra pure water (UPW) comprising (a) a microporous cationically charged membrane having an upstream surface and a downstream surface; and (b) a porous asymmetric membrane having a first surface and an upstream portion and a downstream portion and a second surface, and a bulk between the first surface and the second surface including the upstream portion and the downstream portion, the porous asymmetric membrane having decreasing pore sizes in a direction from the first surface and the upstream portion to the downstream portion and the second surface, the second surface comprising a skin having a nanoporous average pore size, wherein the first surface of the porous asymmetric membrane contacts the downstream surface of the microporous cationically charged membrane.

In accordance with another embodiment of the invention, a method of filtering UPW comprises passing the UPW through a filter comprising (a) a microporous cationically charged membrane having an upstream surface and a downstream surface; and (b) a porous asymmetric membrane having a first surface and an upstream portion and a downstream portion and a second surface, and a bulk between the first surface and the second surface including the upstream portion and the downstream portion, the porous asymmetric membrane having decreasing pore sizes in a direction from the first surface and the upstream portion to the downstream portion and the second surface, the second surface comprising a skin having a nanoporous average pore size, wherein the first surface of the porous asymmetric membrane contacts the downstream surface of the microporous cationically charged membrane, the method including passing the UPW through the microporous cationically charged membrane before passing the UPW through the porous asymmetric membrane.

BRIEF DESCRIPTION OF THE SEVERAL VIEWS OF THE DRAWING(S)

DETAILED DESCRIPTION OF THE INVENTION

Figure 1:
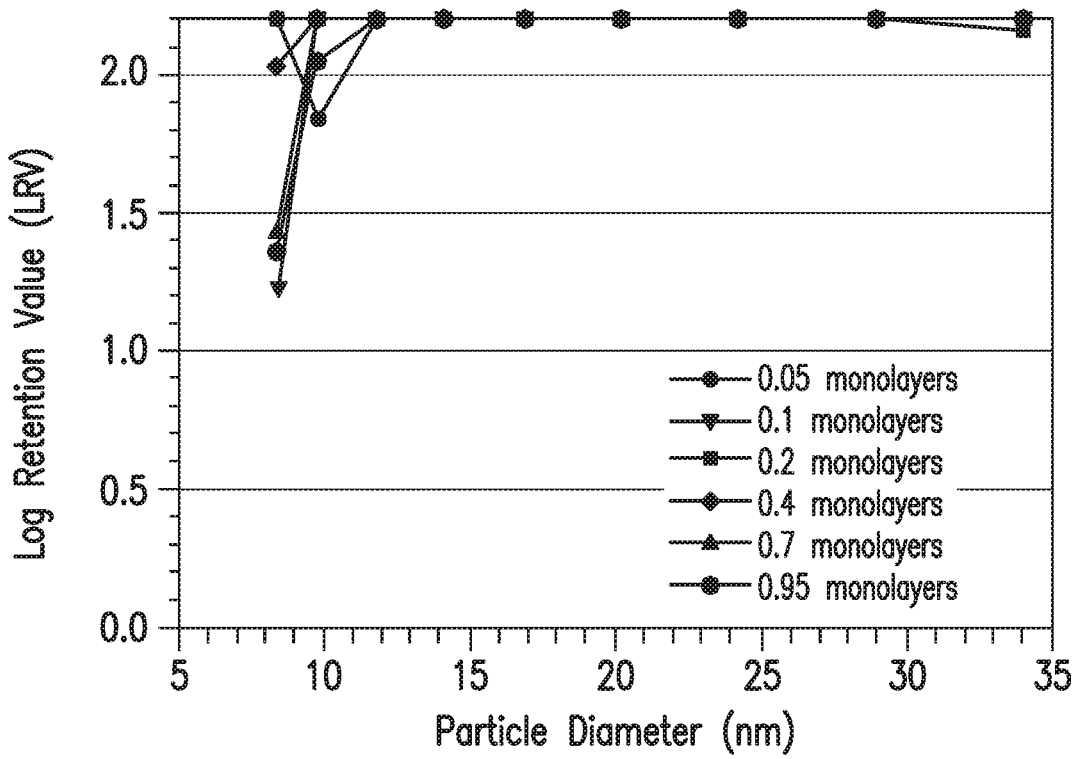
FIG. 1 is graph showing the colloidal silica log retention value (LRV) of particles having a mean diameter size in the range of from about 10 nm to about 12 nm for a filter having an upstream microporous cationically charged membrane and a downstream porous asymmetric membrane according to an embodiment of the invention.

In accordance with an embodiment of the invention, a filter for removing undesirable material from UPW comprises (a) a microporous cationically charged membrane having an upstream surface and a downstream surface; and (b) a porous asymmetric membrane having a first surface and an upstream portion and a downstream portion and a second surface, and a bulk between the first surface and the second surface including the upstream portion and the downstream portion, the porous asymmetric membrane having decreasing pore sizes in a direction from the first surface and the upstream portion to the downstream portion and the second surface, the second surface comprising a skin having a nanoporous average pore size, wherein the first surface of the porous asymmetric membrane contacts the downstream surface of the microporous cationically charged membrane.

In accordance with another embodiment of the invention, a method of filtering UPW comprises passing the UPW through a filter comprising (a) a microporous cationically charged membrane having an upstream surface and a downstream surface; and (b) a porous asymmetric membrane having a first surface and an upstream portion and a downstream portion and a second surface, and a bulk between the first surface and the second surface including the upstream portion and the downstream portion, the porous asymmetric membrane having decreasing pore sizes in a direction from the first surface and the upstream portion to the downstream portion and the second surface, the second surface comprising a skin having a nanoporous average pore size, wherein the first surface of the porous asymmetric membrane contacts the downstream surface of the microporous cationically charged membrane, the method including passing the UPW through the microporous cationically charged membrane before passing the UPW through the porous asymmetric membrane.

In a preferred embodiment, the filter has a colloidal silica log retention value (LRV) of particles having a mean diameter size in the range of from about 10 nanometers (nm) to about 12 nm of at least about log 2 (about 99%).

The colloidal silica LRV can be characterized as is known in the art. Preferably, the colloidal silica LRV is characterized for particles having a mean diameter size in the range of from about 10 nm to about 12 nm of at least about log 2 (about 99%) based on SEMI C79-0113, "Guide to Evaluate the Efficacy of Sub-15 nm Filters used in Ultrapure Water (UPW) Distribution System" (2013).

Preferably, the target level of purity of the filtered UPW is at least about 1.3 LRV at 10 nm.

Advantageously, silica and hard particles can be removed efficiently, while maintaining desirable flow rates.

Without being limited to any particular mechanism it is believed that dissolved, colloidal, and particulate silica are removed by a combination of sieving with other mechanisms.

The filter can include additional elements, layers, or components, that can have different structures and/or functions, e.g., at least one of any one or more of the following: prefiltration, support, drainage, spacing and cushioning. Illustratively, the filter can also include at least one additional element such as a mesh and/or a screen.

In some embodiments, the filter further comprises an upstream support contacting the upstream surface of the microporous cationically charged membrane, and a downstream support contacting the downstream portion of the porous asymmetric membrane. For example, the upstream support and the downstream support can each comprise a metallocene mesh or screen.

In an embodiment, the filter comprises a hollow cylindrical filter, typically, a pleated filter.

An embodiment of a filter device in accordance with an embodiment of the invention comprises an embodiment of the filter having a hollow cylindrical configuration, arranged in a housing having an outer cage and an inner core. In some embodiments, the filter is a pleated filter.

The membranes can have any suitable pore structure, e.g., a pore size (for example, as evidenced by bubble point, or by KL as described in, for example, U.S. Pat. No. 4,340,479, or evidenced by capillary condensation flow porometry), a mean flow pore (MFP) size (e.g., when characterized using a porometer, for example, a Porvair Porometer (Porvair plc, Norfolk, UK), or a porometer available under the trademark POROLUX (Porometer.com; Belgium)), a pore rating, a pore diameter (e.g., when characterized using the modified OSU F2 test as described in, for example, U.S. Pat. No. 4,925,572), or removal rating media. The pore structure used depends on the size of the particles to be utilized, the composition of the fluid to be treated, and the desired effluent level of the treated fluid.

Typically, the charged membranes have pore sizes in the range of from about 0.01 micrometers to about 10 micrometers, preferably in the range of about 50 nm to about 100 nm.

The second (or downstream) surface of the porous asymmetric membrane comprises a skin having a nanoporous average pore size, typically in the range of about 3 nanometers to about 1 nanometer, preferably about 2 nanometers.

Typically, the porous asymmetric membrane has pore sizes in the bulk between the first surface and the second surface having an average diameter of from about 5 times to about 100 times the diameter of the nanoporous average pore size in the skin.

Each of the components of the invention will now be described in more detail below.

Exemplary charged membranes are disclosed in, for example, U.S. Pat. No. 6,565,748, and exemplary asymmetric membranes are disclosed in, for example, U.S. Pat. Nos. 6,045,899; 6,110,369; 6,440,306; 6,565,782; 6,939,468; and 7,125,493.

Exemplary membranes are discussed in more detail below.

Charged Membranes

Preferably, for cationic charge modification of a formed initially hydrophobic membrane, the membrane is made hydrophilic with any of the improved polymeric wetting agents of the present invention, following which the membrane is simply contacted simultaneously with a first and second charge-modifying agent in aqueous solution for a brief period, following which the membrane is dried under thermal conditions designed to induce crosslinking which reduces leaching of the first and second charge-modifying agents from the membrane. The first cationic charge-modifying agent may be a polyamine, such as hydroxyethylated polyethyleneimine (HEPEI) or an aziridine-ethylene oxide copolymer. The second cationic charge-modifying agent may be either a high or low molecular weight epichlorohydrin-modified highly branched polyamine. Such polyamines can include the high molecular weight KYMENE 736 and KYMENE 450 resins and the RETEN 201 (50,000 daltons) low molecular weight resin. The molecular weight of the polyamine is typically selected based on the "openness" of the formed membrane. For example, higher molecular weight polyamines are preferably utilized in connection with relatively large pored sheet or membranes, while lower molecular weight compounds are utilized in connection with "tighter" pored membranes, such as membranes having pore sizes less than 0.02 µm.

A formed initially hydrophobic membrane made hydrophilic with any of the polymeric wetting agents may also be contacted briefly with either the first or second charge-modifying agent alone in aqueous solution, following which the membrane is dried under thermal conditions to induce crosslinking, to produce a cationic charge-modified membrane.

Sufficient cationic charge modification of a membrane can be achieved by producing a membrane by casting a polymer blend containing a sulfone polymer with a copolymer of vinylpyrrolidone and a cationic imidazolinium compound without the use of an epoxide crosslinking agent or an epichlorohydrin modified polyamine to ensure the formation of crosslinks between the sulfone polymer and the cationic polymer and within the cationic polymer. Sufficient irreversible cationic charge modification of a membrane produced by casting a polymer blend can be achieved without a chemically-induced crosslinking process altogether.

A simple thermal-induced crosslinking of the cationic charge-modifying polymer with itself and the other components of the polymer blend can be employed to produce an irreversibly cationically charged membrane. Such membranes produced by casting a polymer blend can also be post-treated with the aforementioned method employing first and second cationic charge-modifying agents.

Formed membranes that are suitable for wetting and charge modification include virtually any formed initially hydrophobic polymer membrane that has sufficient porosity so as to allow treatment with the wetting and cationic charge-modifying agents or agent. Formed membranes are initially hydrophobic and are rendered hydrophilic through surface treatment with an effective amount of a polymeric wetting agent. More than one polymeric wetting agent may also be employed simultaneously. A wetting agent as used herein has the ability to cause a surface to have increased wettability by water. Generally, suitable wetting agents will contain hydrophilic chemical functional groups such as hydroxyl groups, carboxylic acid groups and the like. Polymeric wetting agents are selected from the group consisting of HPC, hydroxypropylmethylcellulose, Methocell™ and other cellulose polymers with hydrophilic functional groups, and PVA, with HPC being particularly preferred.

A variety of hydrophobic polymers that can be formed into a membrane can be rendered hydrophilic through treatment with the wetting agents described above. Preferred polymers include sulfone polymers, such as polysulfone, polyarylsulfone, and polyethersulfone, fluorinated polymers, such as polyvinylidene difluoride (PVDF) and polytetrafluoroethylene (PTFE), polypropylene, and others such as polyethylene.

Preferably, the first cationic charge-modifying agent is a polyamine or an aziridine-ethylene oxide copolymer. The polyamine and aziridine-ethylene oxide copolymer do not contain any epoxide or epichlorohydrin or like substituents capable of initiating chemical crosslinking with other functional groups or substituents. The polyamine is preferably selected from polyethyleneimine and like polyamines. The polyamine is most preferably an aliphatic polyamine having at least one secondary amine and a carboxyl or hydroxyl substituent.

The aziridine-ethylene oxide copolymer can include contains at least one cationic aziridinium substituent as disclosed in U.S. Pat. No. 4,797,187. In an embodiment, the first cationic charge-modifying agent is hydroxyethylated polyethyleneimine (HEPEI) having the general structure:

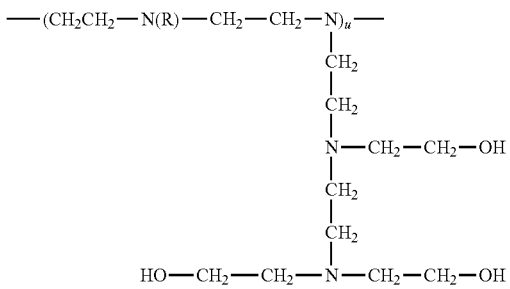

wherein R can be H or a continuation of the polymer chain. Preferred HEPEI possesses a molecular weight of between about 40,000 and 80,000 daltons, for example, 60,000 daltons. Low molecular weight polyethyleneimine compounds can also be employed. One example of the latter compounds is poly G-20, a low molecular weight polyethyleneimine.

Preferably the HEPEI is dissolved in a suitable aqueous solution along with the second cationic charge-modifying agent, the solution optionally containing buffers and other agents such as tonicity agents or electrolytes.

The second cationic charge-modifying agent may be characterized generally as a water soluble organic polymer having a molecular weight greater than about 1000 daltons, wherein the polymer has at least one epoxide or epichlorohydrin substituent capable of bonding to the first cationic charge-modifying agent or the surface of the wetting agent-modified membrane and wherein the polymer also has at least one tertiary amine or quaternary ammonium group capable of providing a cationic charge site. For example, the second cationic charge-modifying agent can be an epichlorohydrin-modified polyamine, such as a polyamine epichlorohydrin resin, a polyamido-polyamine epichlorohydrin resin, or a resin based upon diallynitrogen-containing materials reacted with epichlorohydrin. Such resins typically are the reaction product of a polyamine with epichlorohydrin and have (i) tertiary amine or quaternary ammonium groups, and (ii) epoxide or epichlorohydrin groups along the polyamine chain capable of bonding to the first cationic charge-modifying agent or surface of the wetting agent-modified membrane. U.S. Pat. No. 4,673,504 discloses cationic polyamine epichlorohydrin resins which are also suitable for use. Depending upon the pore size of the membrane to be treated, either a high or a low molecular weight second cationic charge-modifying agent can be used. Examples of suitable epichlorohydrin-modified polyamines include the high molecular weight KYMENE 736 and KYMENE 450 resins and the RETEN 201 (50 K MW) low molecular weight resin. KYMENE 736 is preferred. The chemical structure of this resin includes an epichlorohydrin-modified quaternary ammonium group.

If desired, HEPEI can be utilized simultaneously with KYMENE 736. Alternatively, either HEPEI or KYMENE 736 may be used alone for cationic charge modification.

Preferably, a formed hydrophobic membrane is (i) treated with a polymeric wetting agent, such as HPC (Krucel, available from Hercules Co., Wilmington, Del.) or Methocell™ (available from Dow Chemical Co., Midland, Mich.), to render it hydrophilic, (ii) dried, (iii) treated with a first and second charge-modifying agent or either agent alone, and (iv) dried, preferably with heat, which additionally induces crosslinking, thus minimizing leaching of the charge-modifying agents or agent.

With cast membranes, treatment with HPC can be conveniently accomplished in a quench or rinse bath immediately or shortly after casting. By way of example, a polysulfone based Wrasidlo-type unstable dispersion phase inversion formulation can be cast onto an inert support and quenched using an aqueous bath including HPC (approximately 0.01 w/v % to about 0.5 w/v %) to form a highly anisotropic microfiltration membrane. The resulting membrane, following drying, is inherently hydrophilic, owing to the HPC treatment.

Formed membranes can also be post-treated with the wetting agent (for example, HPC) to obtain a hydrophilic membrane by a variety of procedures known in the art. An exemplary aqueous solution generally includes approximately 0.01 w/v % to about 0.5% w/v % of the wetting agent. Additionally, a low concentration of a surfactant such as Zonyl can be employed to assist in the initial aqueous wetting of the membrane by the wetting agent. Other nonionic or anionic surfactants can also be utilized. A small amount of isopropyl alcohol (about 0.6 w/v %) can also be used to facilitate the wetting agent treatment of the membrane. Other low molecular weight solvents can also be utilized. Typically, treatment is carried out in a bath containing the wetting agent. The membranes can then be centrifuged for about 30 seconds to remove excess fluids and then oven dried at a suitable temperature and time, for example at 100° C. for four hours.

Once the membrane is formed, rendered hydrophilic, and preferably is dried, the membrane is ready for charge modification. In a preferred embodiment, the membrane is contacted with an effective amount of the first and second charge-modifying agent simultaneously or either agent alone in an aqueous solution. A variety of procedures for contacting the membrane with the charge-modifying agents or agent are suitable and known in the art.

An effective amount of a cationic charge-modifying agent generally is a concentration of the first and second charge-modifying agent, or either agent alone, of between about 0.1 w/v % and about 5.0 w/v %, and preferably between about 1.0 w/v % and about 3.0 w/v %. For example, in a preferred embodiment, where HEPEI and KYMENE 736 are used as the first and second charge-modifying agent, respectively, a membrane is contacted with an aqueous solution containing 1 w/v % HEPEI and 1.2 w/v % KYMENE 736. The membrane is typically contacted with the charge-modifying agents for between 1 second and 60 seconds. The pH of the aqueous solution containing the charge-modifying agents or agent typically is adjusted to optimize the interaction of the charge-modifying agent with the membrane. In the embodiment wherein HEPEI and KYMENE 736 are used as the first and second charge-modifying agent, respectively, a membrane can be contacted with an aqueous solution with a pH between about 8 and about 8.5.

A cationic charge-modified membrane can be prepared by casting in a film a mixed polymer solution containing a sulfone polymer, a copolymer of vinylpyrrolidone and a cationic imidazolinium compound, a low molecular weight organic acid and a solvent, quenching the resulting film in an aqueous bath, and washing and drying the coagulated membrane. In a preferred embodiment, the sulfone polymer may be selected from the group consisting of polysulfone, polyarylsulfone and polyethersulfone. Polyethersulfone is preferred. Polyethersulfone can be employed with the chemical structure and molecular weight range as described in U.S. Pat. No. 5,531,893. Generally, a concentration between about 5 and about 50% by weight of sulfone polymer (for example, between about 10 and about 25% by weight) may be employed in the polymer solution. The copolymer of vinylpyrrolidone and a cationic imidazolinium compound may be any copolymer containing any number of repeating vinylpyrrolidone groups and imidazolinium groups. Generally, a concentration between about 0.5 and about 10% by weight of copolymer may be employed in the polymer solution.

Asymmetric Membranes

Asymmetric membranes are preferably prepared utilizing a relatively hydrophobic polymer. The hydrophobic polymer is a sulfone polymer, which encompasses any polymer containing a sulfone moiety. Examples of suitable sulfone polymers are polysulfone, polyethersulfone, and polyarylsulfone. A hydrophilic second polymer is utilized in addition to the hydrophobic polymer. Preferably, the second polymer is polyvinylpyrrolidone. It may also be a co-polymer derivative of polyvinylpyrrolidone, such as a polyvinylpyrrolidone/polyvinylacetate co-polymer.

Casting solutions typically include both a solvent for the polymer and a non-solvent for the polymer. The non-solvent for the polymer is preferably a solvent for the second polymer, if a second polymer is present. Further, when the dope solution is prepared, the second polymer, being hydrophilic, may itself act as an additional nonsolvent for the polymer. Therefore, nonsolvents may include any part of the dope mix that does not contribute to the solubility of the polymer. The collective group of nonsolvents may be subdivided for convenience of reference between "polymer nonsolvents" and "nonpolymer nonsolvents," or "other nonsolvents." A typical polymer nonsolvent is polyvinylpyrrolidone, and a typical nonpolymer nonsolvent is water.

Casting solutions are preferably homogeneous and stable. Illustratively, casting formulations can be prepared utilizing the following ratios:

| | |
|---|---|
| sulfone polymer | about 9% to about 12% |
| polyethylene glycol | about 15% to about 25% |
| polyvinylpyrrolidone | about 3% to about 15% |
| other nonsolvent (water) | about 0.5% to about 5% |
| solvent | balance - (about 43% to about 72.5%) |

In this formulation, polyethylene glycol, polyvinylpyrrolidone, and water all function as nonsolvents in the dope mix. Accordingly, in this formulation, the total nonsolvents may constitute between about 18.5% and 45% of the dope mix.

Asymmetric membranes are ordinarily cast using procedures known in the art. It is preferable to expose the cast membrane to humid air prior to quenching the membrane. Exposure times may vary, depending on the degree of openness desired for the membrane pores. Humid air exposure acts to open the pores of the forming membrane. Preferred exposure times range from 2 to 20 seconds and preferably from 2 to 15 seconds and most preferably 3 to 10 seconds. Relative humidities are preferably in the range of about 50% to 90% relative humidity and more preferably 55% to 80% relative humidity and most preferably 60% to 75% relative humidity.

The asymmetric polymer membranes retain a substantial degree of asymmetry while having relatively large microporous skin pores. In general, the average microporous skin pore size or diameter of the microporous skin pores of the membranes of the invention is greater than about 0.1 µm, and typically is greater than 0.5 µm or 1.0 µm.

Substantially asymmetric, as used herein, means a degree of asymmetry similar to that disclosed in, and possessed by, membranes prepared in accordance with U.S. Pat. Nos. 4,629,563; 4,774,039; 5,188,734; and 5,171,445. In that regard, the membranes typically have average microporous skin pore sizes of greater than about 0.1 µm, while on the reverse side, the side adjacent to the support paper or belt during casting, SEMS show that the average pore sizes are at least five times the average microporous skin pore size. Thus, the ratio of microporous skin pore size to cast surface pore size is about 5:1, and in some embodiments is 10:1, 50:1, 100:1, or even 1000:1.

Asymmetric membranes can be prepared from homogeneous solutions as well as dispersions. In preferred embodiments, the membranes of the invention are prepared from homogeneous solutions. Homogeneous solutions can be prepared through use of solvents alone, or in combination with nonsolvents. Membranes prepared from dispersions can be formed with bubble points in the same general range as those made from homogeneous solutions. However, such membranes generally require longer periods of exposure to the air before quenching.

The asymmetric membranes are preferably prepared from a homogeneous solution containing a hydrophobic polymer, such as, for example, a sulfone polymer; a hydrophilic polymer such as, for example, polyvinylpyrrolidone; and a suitable solvent for the hydrophobic polymer and the hydrophilic polymer. Where polysulfone is utilized, the polymer concentration is generally between about 8-17%, or more preferably between about 9-15%, and most preferably between about 10-12%.

The hydrophilic polymer may be any polymer that is compatible with the hydrophobic polymer. In preferred embodiments, the hydrophilic polymer is polyvinylpyrrolidone. In another preferred embodiment, the hydrophilic polymer is a co-polymer of polyvinylpyrrolidone and polyvinylacetate. The hydrophilic polymer is included at between about 3 and 15%, more preferably between about 3 and 12%, and most preferably between 4 and 10%.

The solvent is selected so as to be a good solvent for each of the hydrophobic polymer and the hydrophilic polymer. Where the hydrophobic polymer is polysulfone and the hydrophilic polymer is polyvinylpyrrolidone, N-methyl pyrrolidine, dimethyl formamide, and dimethyl acetamide operate effectively as the solvent. In highly preferred embodiments, dimethyl formamide is utilized as the solvent.

Partial or complete dispersion formulations can be prepared through the inclusion of a nonsolvent for at least the hydrophobic polymer. For example, water may be added to the formulations in sufficient quantities to create a dispersion casting dope. Alternatively, smaller quantities of nonsolvents, or weaker nonsolvents than water, may be utilized to form homogeneous solutions. Where a complete dispersion is desired, one can add another nonsolvent, for example an alcohol such as tertiary amyl alcohol in a sufficient quantity to replace or supplement water as the nonsolvent. Thus, combinations of nonsolvents, or single species of nonsolvents, can be utilized to prepare casting dopes with particular qualities. High nonsolvent concentrations can be used to create dispersion formulations, whereas, lower nonsolvent concentrations can be used to form homogeneous solutions. Quantities of nonpolymer nonsolvent can be varied from about 0.1% through about 10%. Preferably, water is utilized as the nonpolymer nonsolvent in an amount effective to prepare a homogeneous casting dope. For example, where water is utilized as the nonsolvent, the water is preferably included in the casting dope from about 0.1% through about 3.0%, and, in highly preferred embodiments, at about 1% to 2%.

The polymer solution is typically cast into a thin film, exposed to a gaseous environment for a predetermined period of time, then quenched in a nonsolvent. The membranes of the invention can be cast using a variety of procedures known in the art. Following casting, the cast dispersion or solution is quenched using procedures known in the art. Typically, quenching is accomplished by moving the cast membrane on a moving belt into the quenching liquid, such as a water bath. The quenching liquid is most commonly water. In the bath, the quench operation precipitates or coagulates the polymer and can produce a microporous skin having the requisite pore sizes and a support region having the characteristic structure. The resulting membrane is ordinarily washed free of entrained solvent and may be dried to expel additional increments of solvent, diluent, and quench liquid, and thus recover the membrane.

Generally, in preparing the asymmetric membranes, prior to quenching, the cast film should be exposed to air sufficiently long to induce the formation of large surface pores, as discussed previously. The shorter the exposure, the higher the humidity must be, and vice versa. At higher ambient air temperatures, the relative humidity can be lower for the same effect. In general, the warmer the quench, the more open will be the membrane.

Generally, casting solution or dispersion temperatures of between about 20° C. and 35° C. and quench bath temperatures of between about 20° C. and 70° C., and preferably 30° C. to about 60° C. are utilized. The temperature of the quench bath appears to cause marked changes in the pore sizes of the microporous skin of the membrane and also in its asymmetry. Where higher quench temperatures are utilized, the membranes possess both larger skin pores and enhanced asymmetry. Conversely, where lower temperatures are utilized, smaller pores form and asymmetry can be reduced.

Preferably, the cast solution or dispersion is exposed to humid air after casting but before quenching. Relative air humidity is preferably greater than about 60%. In addition, the air is preferably circulated to enhance contact with the cast solution or dispersion. Circulation can be accomplished with a fan, for example.

The exposure time is generally from about 2 seconds to about 20 seconds. Increasing exposure time, over this range, tends to increase permeability of the resulting membrane.

In some embodiments, asymmetric membranes have a pore density greater than 15 pores/1000 $\mu m^2$. For example, the pore density can be 25 pores/1000 $\mu m^2$, or greater, e.g., greater than 30 pores/1000 $\mu m^2$.

The charged and asymmetric membranes can have any desired critical wetting surface tension (CWST, as defined in, for example, U.S. Pat. No. 4,925,572), and selected as is known in the art, e.g., as additionally disclosed in, for example, U.S. Pat. Nos. 5,152,905, 5,443,743, 5,472,621, and 6,074,869. Typically, the membranes each have a CWST of about 50 dynes/cm (about $50 \times 10^{-5}$ N/cm) or greater, in some embodiments, about 60 dynes/cm (about $60 \times 10^{-5}$ N/cm) or greater.

In accordance with embodiments of the invention, the membrane, filter, and/or filter element can have a variety of configurations, including planar, pleated, and hollow cylindrical. Embodiments of the invention are particularly suitable for "laid-over-pleat" (LOP) filter and filter device configurations (as described in, for example, U.S. Pat. No. 5,543,047).

The filter can include additional elements, layers, or components, that can have different structures and/or functions, e.g., at least one of any one or more of the following: prefiltration, support, drainage, spacing and cushioning. Illustratively, the filter can also include at least one additional support and/or drainage element such as a mesh and/or a screen or a woven or non-woven fabric.

A variety of media, including commercially available media, are suitable for providing support and/or drainage. The support and/or drainage materials (meshes and fabrics) can be fabricated from any suitable material which is suitable for the fluid (UPW) being filtered and for the applicable filtration parameters such as temperature.

In those embodiments comprising meshes wherein the meshes are polymeric, polymeric meshes come in the form of woven meshes and extruded meshes. Either type may be employed, but extruded meshes can be preferable because they are smoother and therefore produce less abrasion of adjoining layers of the filter media. An extruded mesh may have a first set of parallel strands and a second set of parallel strands intersecting the first set of strands at an angle. Extruded meshes may be classified as either symmetrical or non-symmetrical. In a symmetrical mesh, neither of the first or second sets of strands extends in the so-called "machine direction" of the mesh, which is the direction in which the mesh emerges from the mesh manufacturing machine. In a non-symmetrical mesh, one of the sets of strands extends parallel to the machine direction. Either symmetrical or non-symmetrical meshes can be used in accordance with embodiments of the invention.

A variety of meshes are suitable for use in accordance with embodiments of the invention. For example, suitable extruded polymeric meshes include those available from Schweiter-Mauduit International Inc. (Alpharetta, Ga.) under the trade name DELNET.

Meshes can be characterized by their thickness and by the number of strands per inch. These dimensions are not limited to any particular values and can be chose in accordance with the desired edgewise flow characteristics of the mesh and the desired strength. Typically, the mesh with have a mesh count of at least about 5 strands per inch.

In those embodiments comprising non-woven fabrics wherein the fabrics are polymeric, the non-woven fabric can be fabricated from any polymeric material, including polyester, polypropylene, or polyamide (e.g., nylon) which is suitable for the fluid being filtered and for the applicable filtration parameters such as temperature.

A variety of non-woven fabrics are suitable for use in accordance with embodiments of the invention. For example suitable non-woven fabrics include polyester spunbonded non-woven fabrics available from Avintiv Technical Nonwovens (Old Hickory, Tenn.) under the trade names REEMAY (e.g., REEMAY 2011 and REEMAY 2250) and TYPAR.

In some embodiments, the support and/or drainage media comprise metallocene media, for example, metallocene polyethylene media such as medium density polyethylene (mMDPE) media. Suitable metallocene media is available from, for example, Chevron Phillips Chemical Company, Univation Technologies, Exxon Mobil Corporation, Tricon Energy Inc., INEOS Olefins and Polymers, The Dow Chemical Company, R. POLYMERS PVT. LTD., B LyondellBasell Industries Holdings. V, ChemChina, Repsol, Total Petrochemical & Refining USA Inc., Reliance Industries Limited, *Borealis* AG, Braskem, and Prime Polymer Co. Ltd.

The filter, in some embodiments comprising a plurality of filter elements is typically disposed in a housing comprising at least one inlet and at least one outlet and defining at least one fluid flow path between the inlet and the outlet, wherein the filter is across the fluid flow path, to provide a filter device. Preferably, the filter device is sterilizable. Any housing of suitable shape and providing at least one inlet and at least one outlet may be employed.

Figure 4:
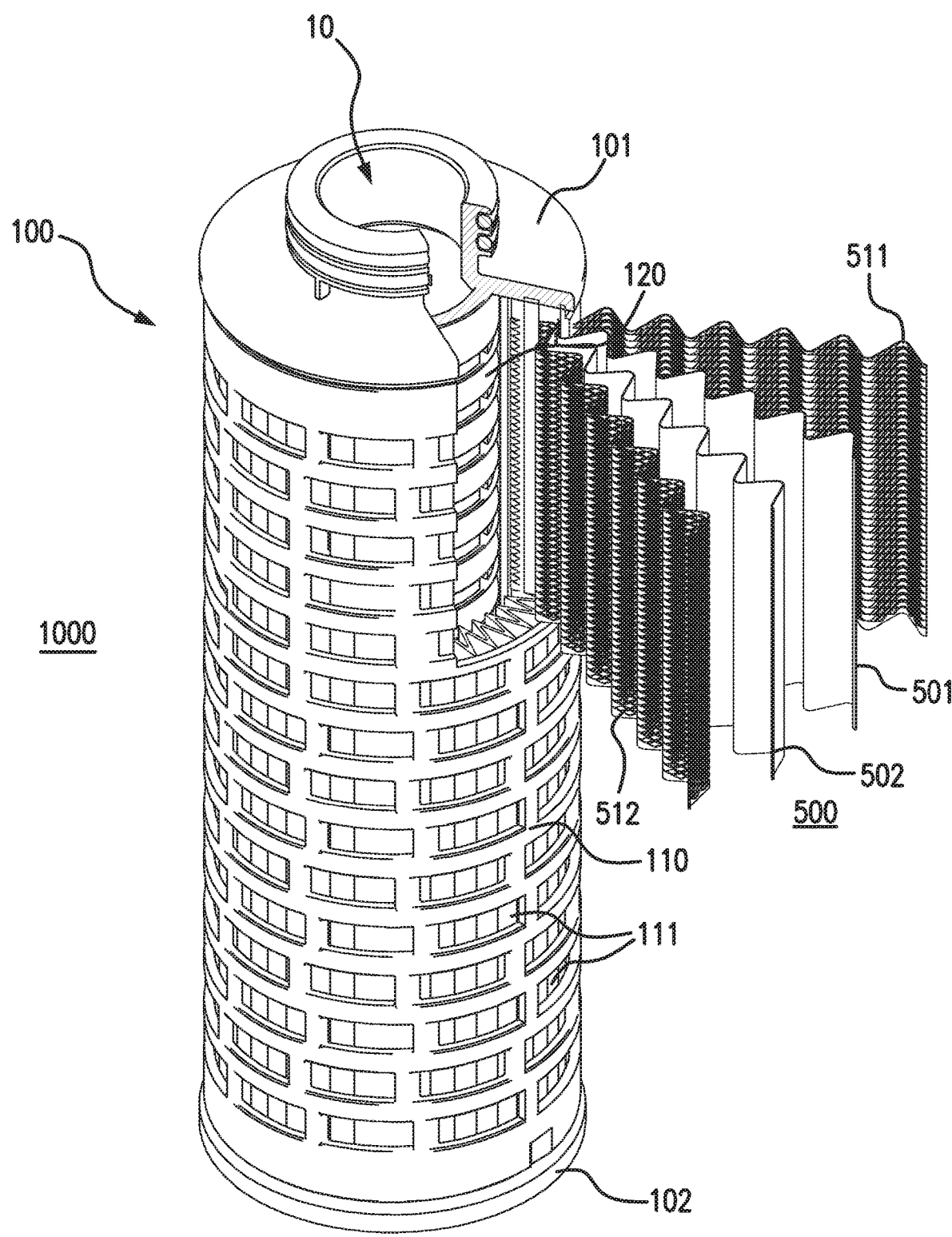
FIG. 4 illustrates a partially cut-away perspective view an exemplary filter device according to an embodiment of the invention, including a filter according to an embodiment of the invention.

For example, FIG. 4 shows an illustrative filter device 1000 including a filter 500 (illustrated as a pleated filter) comprising the charged membrane 501 and the asymmetric membrane 502 arranged in a housing 100, wherein the filter has a generally cylindrical form and the housing includes two end caps 101, 102 which seal the ends of a filter. Portions of the top end cap 101 (including an outlet 10) and the filter 500 are partially cut away to show the interior of the filter. In this illustrated embodiment, an outer cage 110 (including openings 111 providing inlets) is disposed along the outer periphery of the filter, and the end caps are sealed to the cage (and, if desired, to the end of the filter). The filter may comprise a plurality of longitudinal curved pleats or radial pleats (not shown).

In the embodiment shown in FIG. 4, a cylindrical core 120 is coaxially disposed along the inner periphery of the filter. A core is typically used when the filter is subject to radially inward (outside to inside) fluid flow. Alternatively, when the filter is subject to radially outward (inside to outside) fluid flow, a cylindrical core may not be necessary.

The illustrated filter further includes a support and/or drainage medium disposed on at least one side, preferably the upstream side, and more preferably on both the upstream and downstream sides of the filter (FIG. 4 illustrates upstream and downstream media 511, 512). The support and/or drainage media prevent opposing surfaces of the filter from coming into contact with one another and enables fluid to evenly flow to or from substantially all portions of the surface of the filter. Thus, virtually the entire surface area of the filter may be effectively used for filtration.

The filter including the support and/or drainage media can be formed into a composite by conventional filter manufacturing techniques, either prior to or simultaneously with corrugation.

The following example further illustrates the invention but, of course, should not be construed as in any way limiting its scope.

Example

This example demonstrates the surprising synergistic effect of a filter having two membranes in accordance with an embodiment of the invention, compared to filters having the individual membranes.

A filter according to an embodiment of the invention is prepared having a microporous cationically (amine) charged membrane prepared as generally described in U.S. Pat. No. 6,565,748, and a porous asymmetric membrane prepared as generally described in U.S. Pat. No. 6,045,899. The filter is arranged such that, during filtration, the charged membrane is upstream of the asymmetric membrane.

The microporous cationically charged membrane has an average pore size in the range of from about 50 nanometers (nm) to about 100 nm. The porous asymmetric membrane has a skin (the downstream or second surface of the membrane) with pores having an average pore size of about 2 nm.

Each membrane has a CWST of about 60 dynes/cm (about $60 \times 10^{-5}$ N/cm).

Filters are also prepared having the single microporous cationically charged membrane, and the single porous asymmetric membrane.

The filters are pleated, and placed between upper and lower mesh no-woven fabric support and/or drainage media, and placed in a housing having a cage and a core as generally shown in FIG. 4.

The three filters are tested in accordance with SEMI C79-0113, "Guide to Evaluate the Efficacy of Sub-15 nm Filters used in Ultrapure Water (UPW) Distribution System" (2013).

Figure 2:
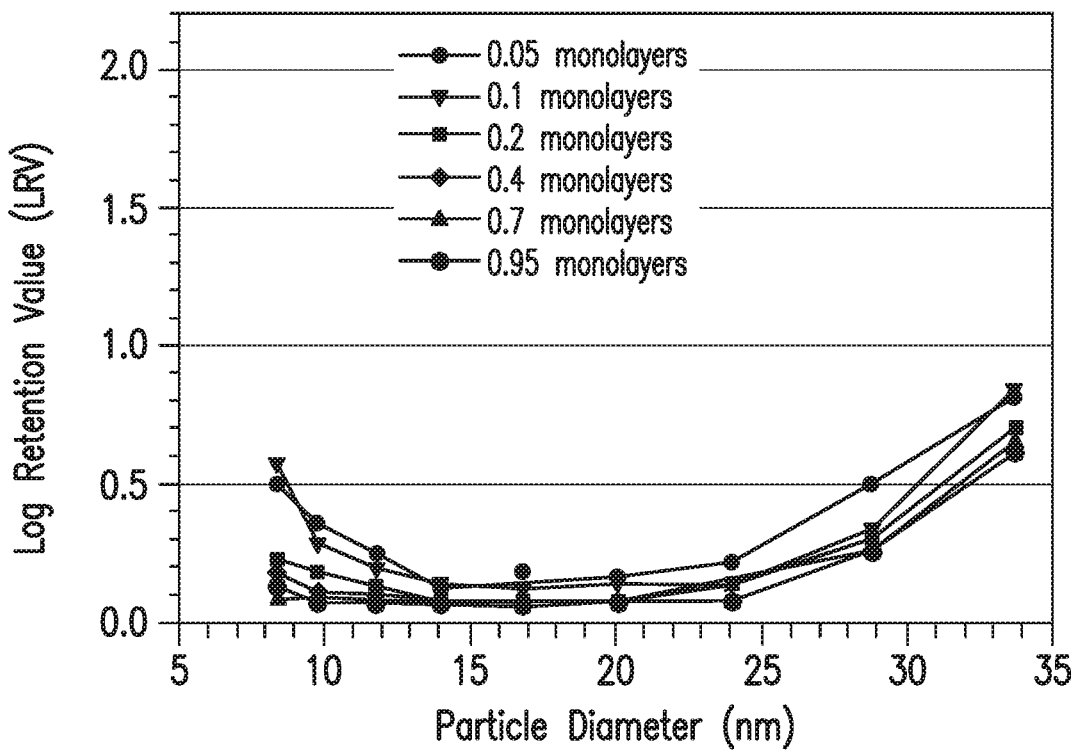
FIG. 2 is a graph showing the colloidal silica log retention value (LRV) of particles having a mean diameter size in the range of from about 10 nm to about 12 nm for a filter having a single porous asymmetric membrane.

As shown in FIG. 2, the filter having the single porous asymmetric membrane has a colloidal silica LRV of particles having a mean diameter size in the range of from about 10 nm to about 12 nm of about log 0.15 to about 0.2 (less than about 20%).

Figure 3:
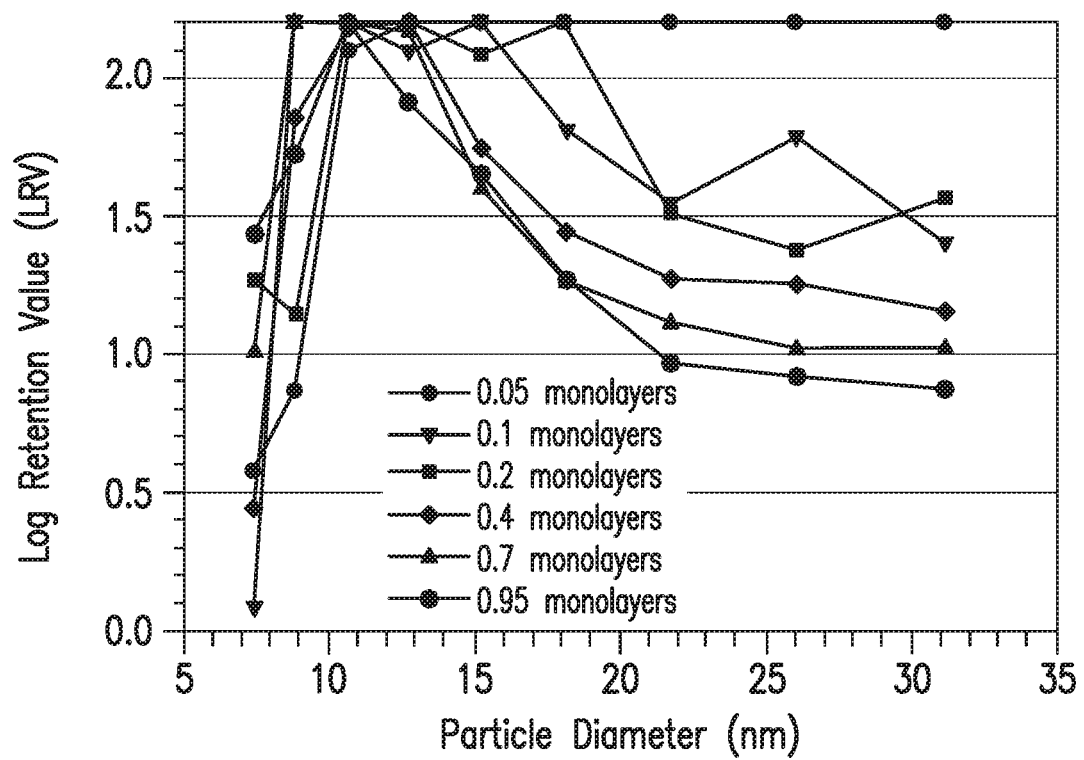
FIG. 3 is a graph showing the colloidal silica log retention value (LRV) of particles having a mean diameter size in the range of from about 10 nm to about 12 nm for a filter having a single microporous cationically charged membrane.

As shown in FIG. 3, the filter having the single microporous cationically charged membrane has a colloidal silica LRV of particles having a mean diameter size in the range of from about 10 nm to about 12 nm of about log 1.1 (about 90%).

Surprisingly, as shown in FIG. 1, the filter according to an embodiment of the invention has colloidal silica LRV of particles having a mean diameter size in the range of from about 10 nm to about 12 nm of about log 2 (about 99%).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of filtering ultra pure water, the method comprising:
    passing ultra pure water through a filter comprising
    (a) a microporous cationically charged membrane having an upstream surface and a downstream surface; and
    (b) a porous asymmetric membrane having a first surface and an upstream portion and a downstream portion and a second surface, and a bulk between the first surface and the second surface including the upstream portion and the downstream portion, the porous asymmetric membrane having decreasing pore sizes in a direction from the first surface and the upstream portion to the downstream portion and the second surface, the second surface comprising a skin having a nanoporous average pore size, wherein the first surface of the porous asymmetric membrane contacts the downstream surface of the microporous cationically charged membrane, the method including passing the ultra pure water through the microporous cationically charged membrane before passing the ultra pure water through the porous asymmetric membrane.

2. The method of claim 1, wherein the nanoporous average pore size of the skin of the filter is about 3 nanometers or less.

3. The method of claim 1, wherein the porous asymmetric membrane of the filter has pore sizes having an average diameter of from about 5 times to about 100 times the diameter of the nanoporous average pore size in the skin of the filter.

4. The method of claim 1, wherein the porous asymmetric membrane of the filter comprises a sulfone membrane.

5. The method of claim 4, wherein the sulfone membrane comprises a polyarylsulfone membrane or a polyethersulfone membrane or a polysulfone membrane.

6. The method of claim 1, wherein the filter has a colloidal silica log retention value (LRV) of particles having a mean diameter size in the range of from about 10 nm to about 12 nm of at least about log 2.

7. The method of claim 1, wherein the filter further comprises an upstream support and/or drainage medium contacting the upstream surface of the microporous cationically charged membrane, and a downstream support and/or drainage medium contacting the downstream portion of the porous asymmetric membrane.

8. The method of claim 1, wherein the filter comprises a hollow cylindrical filter.

9. The method of claim 8, wherein the filter comprises a pleated filter.

* * * * *